(12) United States Patent
Warren et al.

(10) Patent No.: US 6,485,634 B2
(45) Date of Patent: Nov. 26, 2002

(54) FILTRATION SYSTEM FOR INDUSTRIAL COOLANTS

(75) Inventors: Harry F. Warren, Erie, PA (US); Jeffrey S. Demenik, Erie, PA (US); Jeffrey A. Enterline, North East, PA (US)

(73) Assignee: Synergy Applications Inc., Erie, PA (US)

( * ) Notice: Subject to any disclaimer, the term of this patent is extended or adjusted under 35 U.S.C. 154(b) by 4 days.

(21) Appl. No.: 09/816,729

(22) Filed: Mar. 22, 2001

(65) Prior Publication Data

US 2001/0030159 A1 Oct. 18, 2001

Related U.S. Application Data

(60) Provisional application No. 60/191,252, filed on Mar. 22, 2000, and provisional application No. 60/191,253, filed on Mar. 22, 2000.

(51) Int. Cl.[7] .................................................. B03C 1/30
(52) U.S. Cl. ............... 210/85; 210/86; 210/90; 210/104; 210/132; 210/167; 210/171; 210/195.1; 210/223; 210/254; 210/257.1; 210/259; 210/340; 210/408

(58) Field of Search ............................. 210/85, 86, 90, 210/104, 132, 167, 171, 130, 172, 168, 195.1, 223, 254, 257.1, 259, 260, 225, 408, 695, 341, 333.1, 340; 508/111; 208/179, 180

(56) References Cited

U.S. PATENT DOCUMENTS 4,033,870 A * 7/1977 Parquet et al.
4,865,724 A * 9/1989 Brandt et al.
4,876,015 A * 10/1989 McKibben

* cited by examiner

Primary Examiner—Joseph W. Drodge
Assistant Examiner—Terry K. Cecil
(74) Attorney, Agent, or Firm—Richard K. Thomson

(57) ABSTRACT

A filtration system includes a magnetic drum for removing ferrous shavings and a dual canister filter unit equipped with replaceable filter bags. This palletized system may be plugged into most machine tools to filter the shavings-laden coolant to remove the metal shavings, tramp oil, sludge and dirt from liquid coolant to extend its useful life and minimize or eliminate down time.

10 Claims, 5 Drawing Sheets

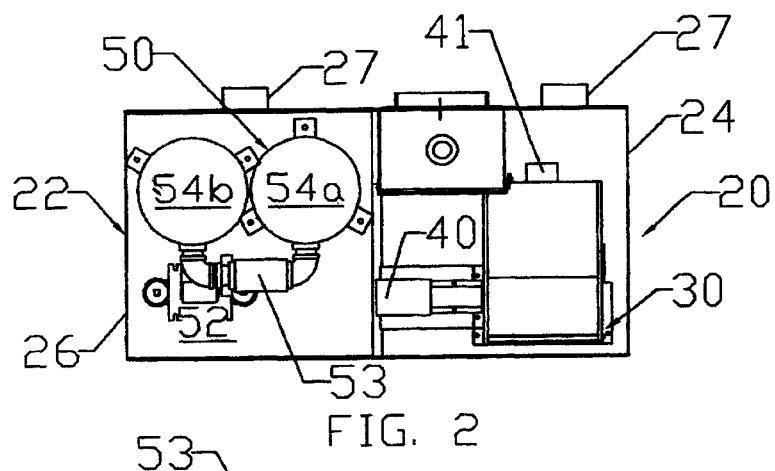
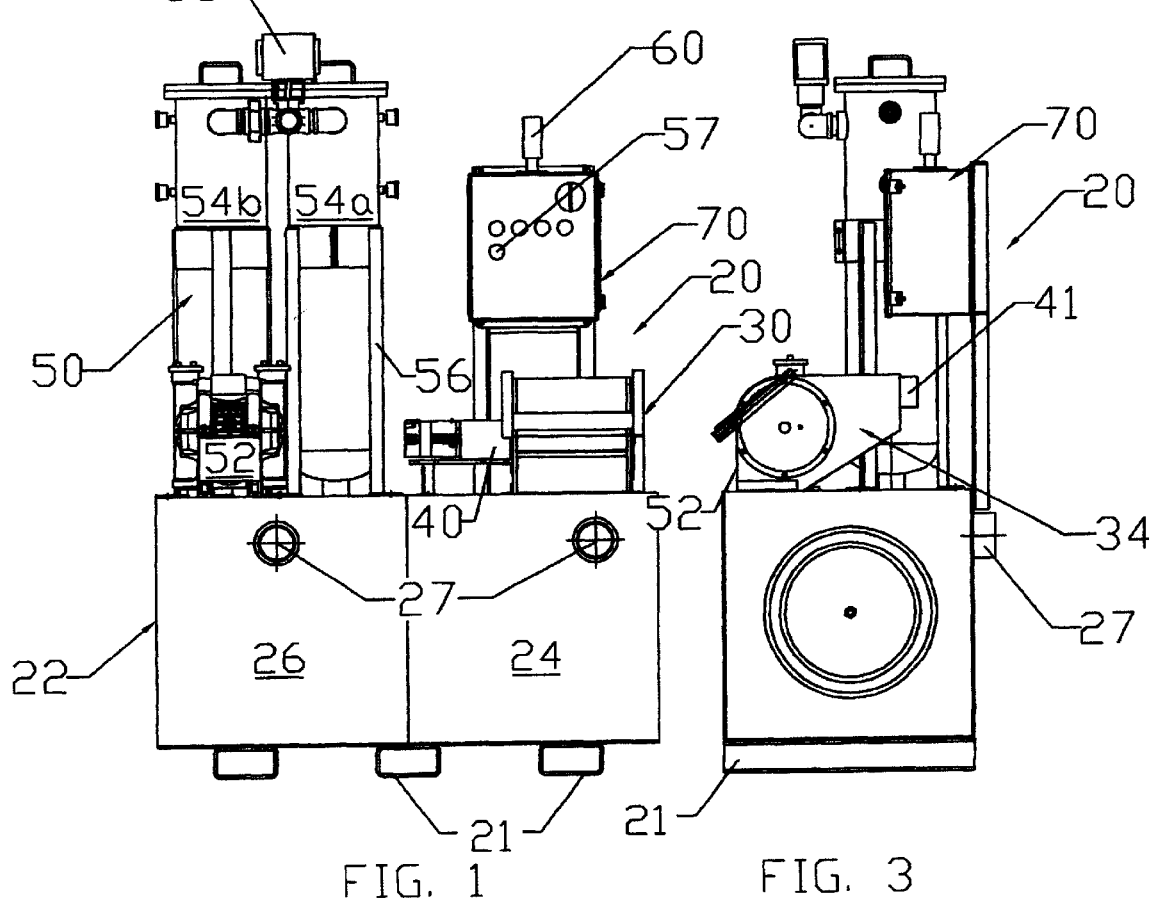

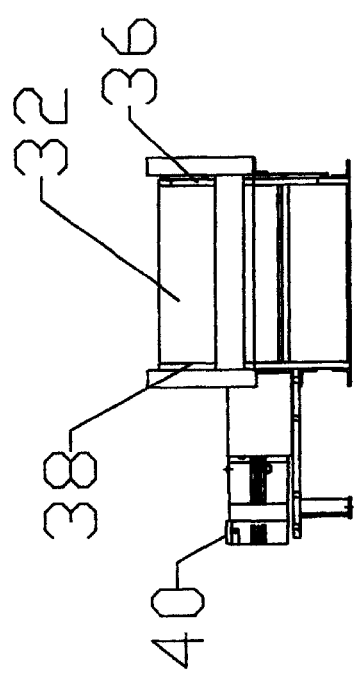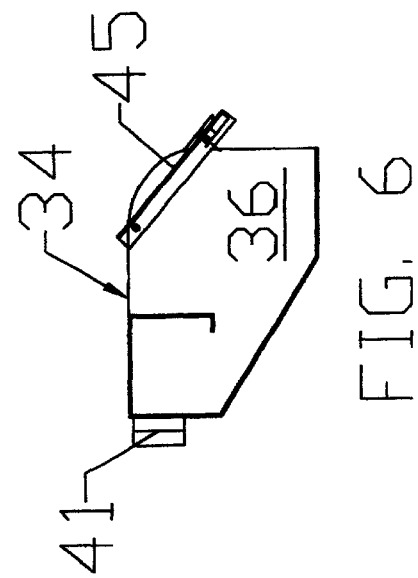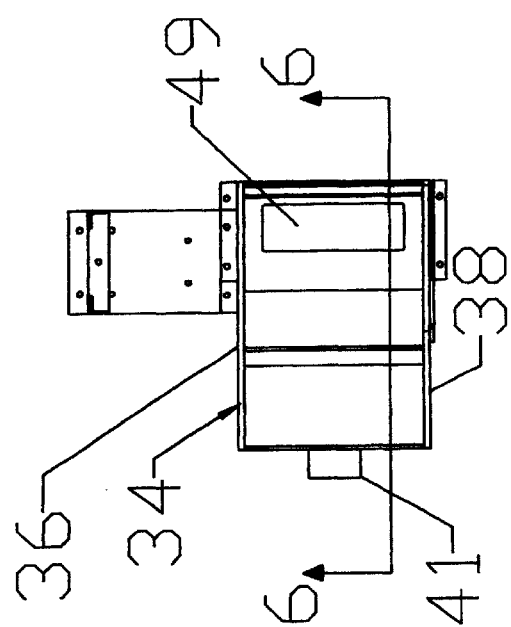

FILTRATION SYSTEM FOR INDUSTRIAL COOLANTS

This application claims priority to provisional application No. 60/191,252 and 60/191,253, both filed Mar. 22, 2000.

BACKGROUND AND SUMMARY OF THE INVENTION

The present invention pertains filtration systems. More particularly, this invention is directed to a filtration system that can recycle industrial liquid coolant used in tooling machines, and the like; the system employs a magnetic separator to remove ferrous materials and a filtration unit having a pair of canisters each with a bag filter that provides built in redundancy for removing dirt and oil down to a particle size of 0.5 microns, if desired.

Magnetic drum separators for removing ferrous shavings from industrial liquid coolant are known in the industry. Further, the use of cylindrical canisters with replaceable filter bags is known for removing particles from fluids. However, these components are not readily combined into a useful system, requiring considerable effort to interconnect the elements with hoses, pumps, etc. It is an object of the present invention to provide a palletized system that can simply be plugged into a machine tool to provide the necessary filtration. This filtration system, marketed under the name HYDRO-MAG, has the potential to lengthen machine tool life, increase production time by reducing scheduled and unscheduled maintenance time, increase usable coolant life and eliminate E.P.A. disposal wastes associated with coolant.

The HYDRO-MAG is a fully automated coolant filtration system designed to separate ferrous material, tramp oil, dirt, grindings, and sludge from industrial liquid coolant. Use of the system will greatly increase the life of the coolant, filter bags and tooling which further reduces down time of the machine tool. The filter system can be operated by 110–120 volts AC and shop air pressure, virtually every shop having these services available.

The filtration system of the present invention comprises a) a tank separated into two sides, a dirty side and a clean side; b) a magnetic separator for removing ferrous material from the liquid; c) a filtration system including i) a first filter for removing particles up to 0.5 microns from the liquid; ii) a second filter for removing particles up to 0.5 microns from the liquid; d) a pump for transferring a stream of liquid from a machine tool, through said magnetic separator and said filtration system into said dirty side of said tank; e) a sensor for detecting when said first filter is approaching an end of its service cycle; f) circuit means to switch the stream of liquid from said first filter to said second filter responsive to said sensor; g) an indicator for warning that said first filter has reached the end of its service cycle so that it can undergo maintenance. The first and second filters are cylindrical canisters equipped with disposable filter bags for removing particulate down to 0.5 microns in diameter. Different bags can remove tramp oil or adjust the particle size to fit a particular machine tool requirement. The means for detecting preferably comprises a pressure sensor for determining when a certain back pressure, 25 psi for example, has been reached upstream of said first filter.

The magnetic separator preferably comprises a drum made up of alternating disks of magnetic material and intermediate spacers. The magnetic drum rotates in a direction opposite that of the flow of coolant into the separator. A key element of the magnetic separator is a floating scraper that maintains constant contact with a surface portion of said drum to remove the metal shavings which are magnetically adhered thereto. A level detecting sensor positioned on the dirty side of said tank activates the filtration system's operation when necessary and shuts down when there is insufficient liquid in need of processing present.

The features of the magnetic separator for removing metal shavings from liquid coolant include: a) a tank for holding a quantity of liquid coolant; b) a magnetic drum composed of alternating disks of magnetic material and spacers positioned in the tank, the magnetic drum being rotated in a direction opposite a direction of flow of a fluid stream of the coolant in the tank; c) a scraper in continuous contact with a surface portion of the magnetic drum to remove ferrous material from the surface which has been extracted from the stream of coolant, the scraper being mounted on a pair of arms, the pair of arms being pivotable about an axis which is above a rotational axis of said magnetic drum to maintain said scraper in continuous contact with the surface of the drum. The magnetic separator includes connectors attached to a rear portion of said tank to facilitate connection to a machine tool and allow flow of dirty coolant into said magnetic separator.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which FIG. 1 is a front view of a first embodiment of the filtration system of the present invention;

FIG. 2 is a top view of the embodiment of the filtration system shown in FIG. 1;

FIG. 3 is a side view of the first embodiment of the filtration system of the present invention;

FIG. 4 is a front view of the magnetic separator used with the filtration system of the present invention with parts broken away;

FIG. 5 is a top view of the magnetic separator shown in FIG. 4 with the drum removed;

FIG. 6 is a sectional view as seen along line 6—6 in FIG. 5;

DETAILED DESCRIPTION OF PREFERRED EMBODIMENT(s)

Figure 7:
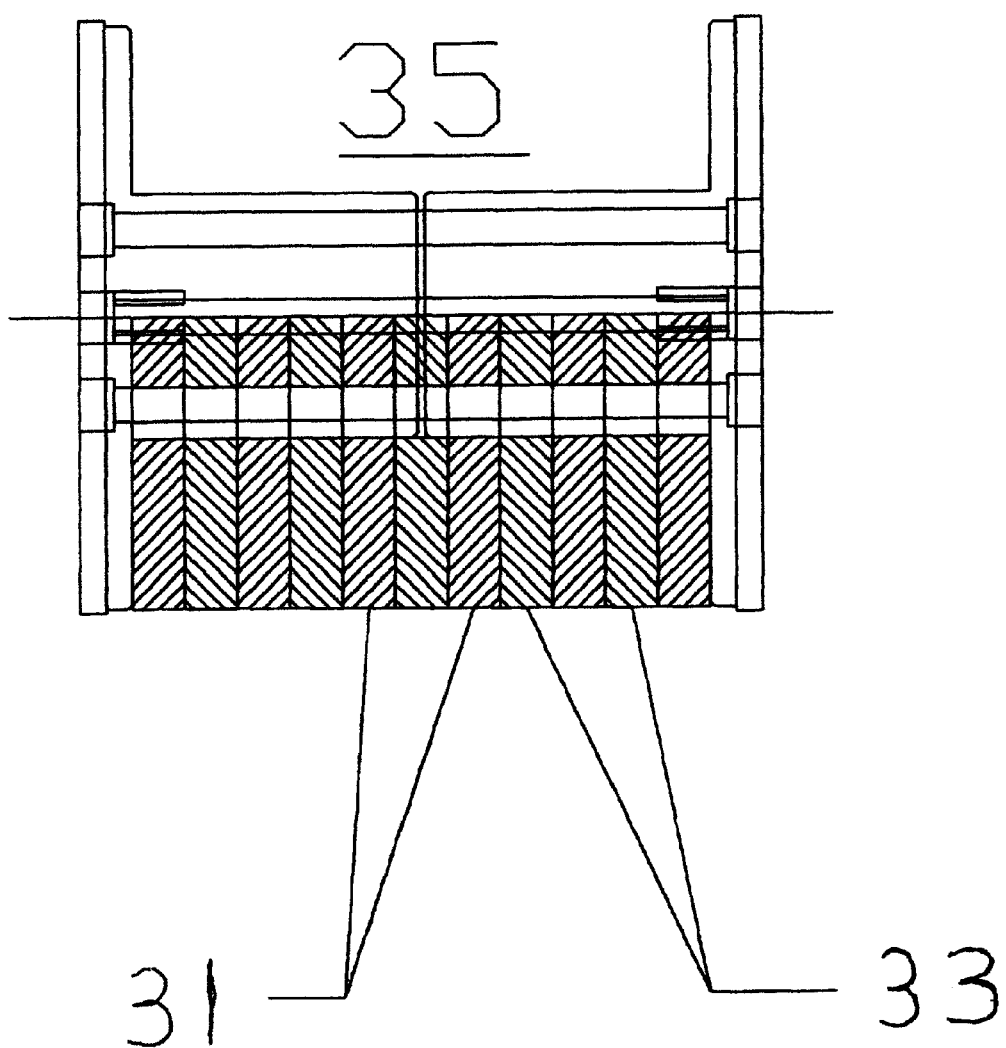
FIG. 7 is a cross-sectional front detail of the magnetic disk used in the magnetic separator.
Figure 8:
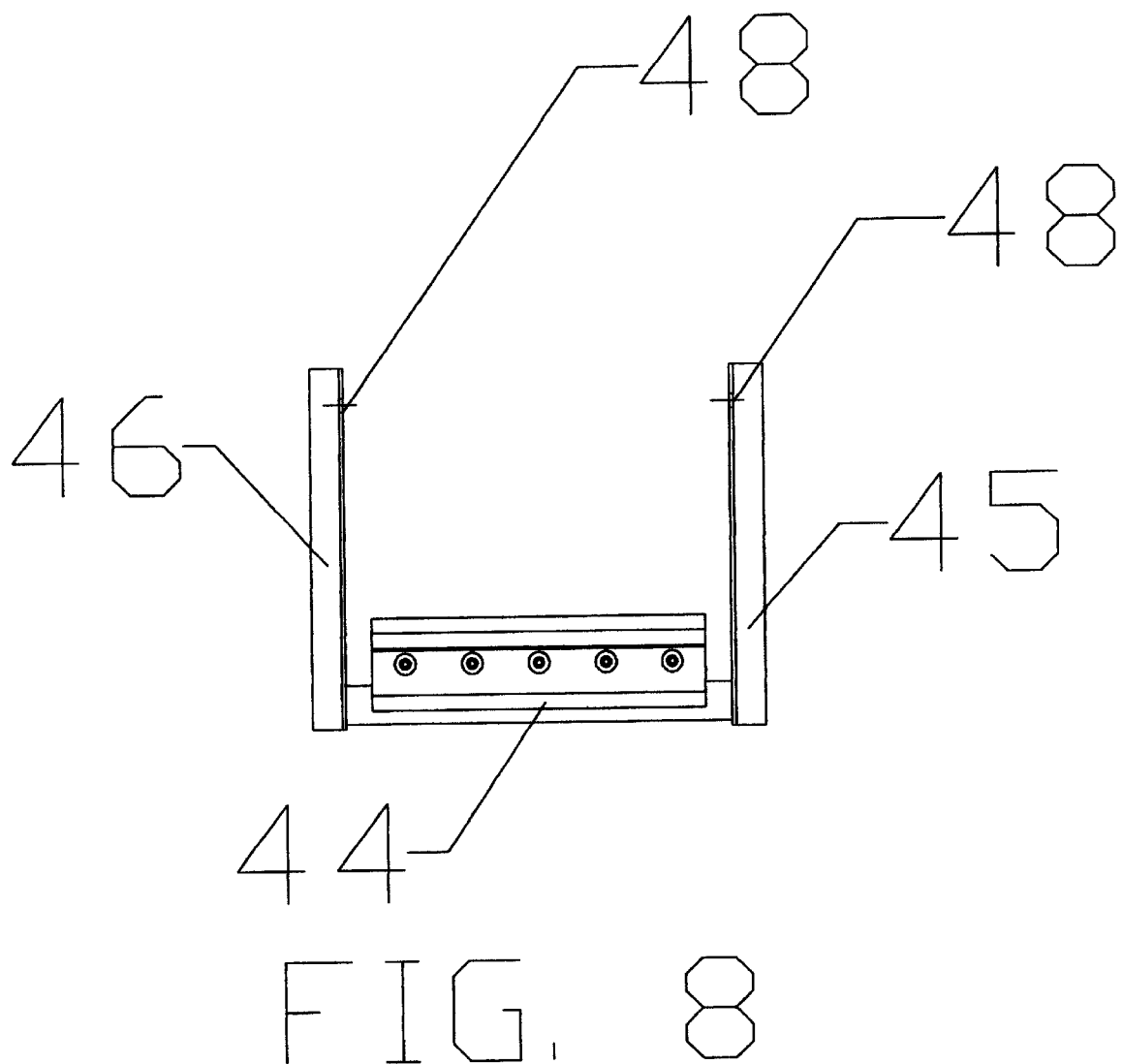
FIG. 8 is a front detail of the scraper used in the magnetic separator.
Figure 9:
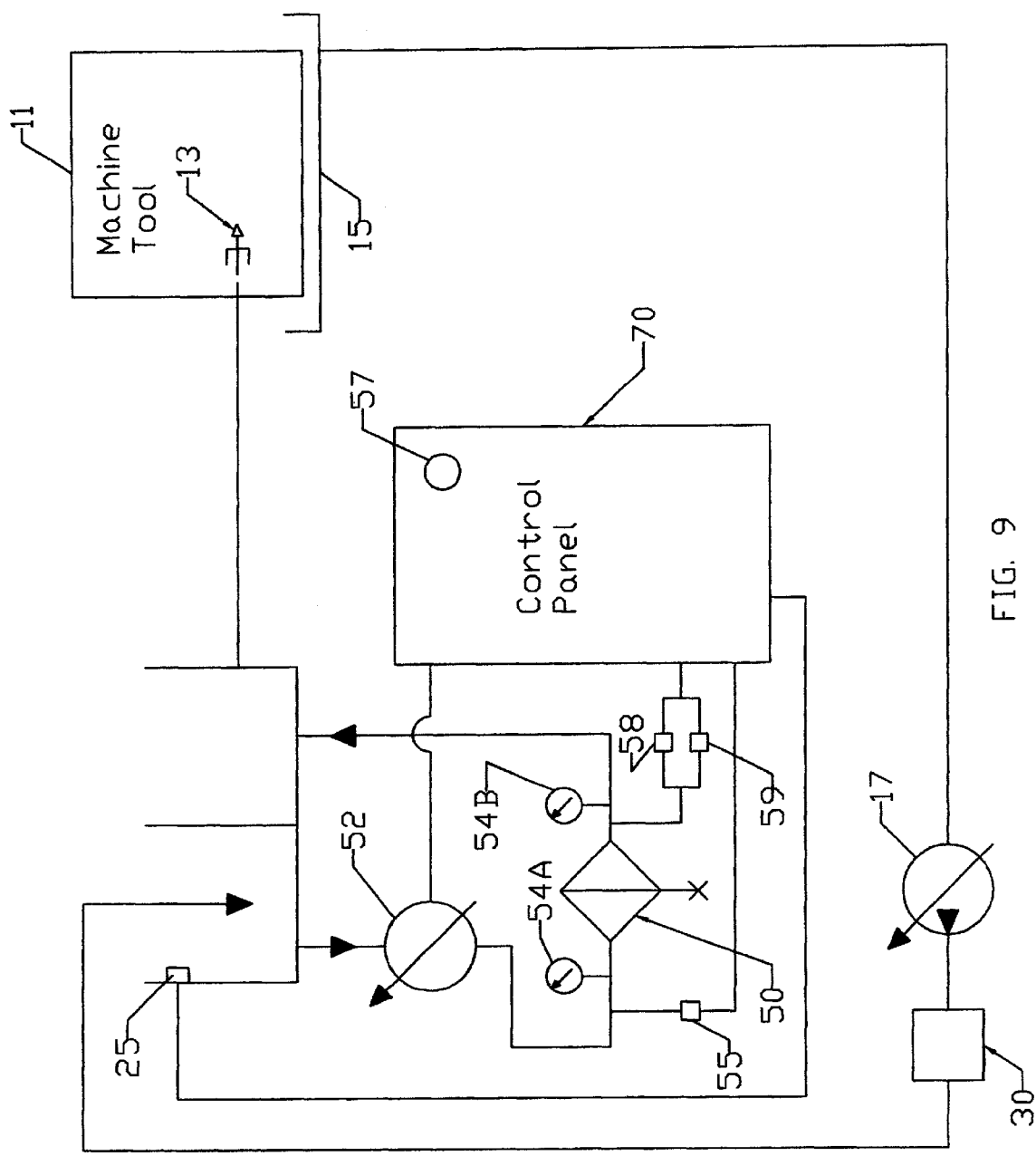
FIG. 9 is a schematic depicting the hydraulic flow path and electronic controls.

A first preferred embodiment of the filtration system of the present invention is shown in FIGS. 1–3 generally at 20 that sits on pallet 21 to facilitate insertion into a machine shop. The filtration system 20 includes a tank 22, a magnetic separator 30, a filtration unit 50 and a control panel 70. Tank 22 has is partitioned into a first dirty compartment 24 and a second clean compartment 26. Each of compartments 24 and 26 is equipped with a fitting 27 to facilitate connection to the machine tool 11. As seen in FIG. 9, shavings-laden coolant is pumped by pump 17 from the sump 15 of machine tool 11 to magnetic separator 30. Separator 30, which can be purchased separately under the trade name MIGHTY MAG, is capable of removing 99% of the ferrous material from the liquid coolant and may operate at flow rates between 1 and 72 gallons per minute.

As better seen in FIGS. 4–8, magnetic separator 30 comprises a drum 32 mounted for rotation in a housing 34 between walls 36 and 38 by an electric motor 40 positioned adjacent housing 34 at a rate of 8 rpm. The rear portion of housing 34 is equipped with a standard fitting 41 to permit easy connection so that dirty coolant may be pumped into separator 30. Drum 32 will rotate contrary to the flow of the coolant flowing into housing 34 through fitting 41. Drum 32 is made up of alternating magnetic disks 31 and spacers 33 in a conventional manner. Disks 31 and 33 are covered by a conductive skin layer 35, preferably of 304 stainless steel, that provides a smooth outer surface. A key element of the magnetic separator 30 of the present invention is the scraper 42. Scraper 42 (FIG. 8) comprises an elastomeric blade 44, preferably a high durometer polyurethane, that is in continuous contact with the skin layer 35 to remove any ferrous materials which are magnetically adhered thereto.

Blade 44 is mounted on arms 45 and 46 which have holes 48 in an upper portion thereof by which scraper 42 is pivotally mounted to walls 36 and 38 on an axis that is above the rotational axis of drum 32. In this manner, scraper blade 44 will "float" in continuous contact with skin layer 35. The ferrous shavings removed from the coolant by drum 32 and from the drum 32 by scraper 42 will drop into a disposal bin, not shown.

The coolant from which the ferrous shavings have been removed flows through opening 49 in the bottom of housing 34 into the dirty compartment 24 of tank 22. When the level of coolant in the tank activates volume sensor 25 in compartment 24, pump 52 in the filtration unit 50 pumps coolant through a first filter 54a. Sensor 25 is preferably a high/low float switch, the type that operates sump pumps and the like, so that the system 50 operates only as needed. Filters 54a and 54b are identical and thus only the former will be described. Filter 54a comprises a canister 56 that contains a replaceable filter bags. Conventional bags have differing filtering capabilities. Customarily, filters 54a and 54b will be equipped with bags to remove particulate down to 5 microns or even 0.5 microns. For an alternative use, the canisters 56 may be equipped with an oil absorbent filter material capable of removing tramp oils, also down to particle sizes of 0.5 microns.

Sensor 55 (FIG. 9) detects the back pressure upstream of first filter 54a. When sensor 55 detects a predetermined back pressure, for example 25 psi, it is an indication that the bag in filter 54a is full. At this point, control panel 70 will cause the valve 53 through which coolant flows to filter 54a to close diverting flow to second filter 54b. An amber lamp will be illuminated so that if desired, the filter bag in first filter 54a may be changed without having to shut down the filter system 20. Once the filter bag has been changed in first filter 54a, pushing reset button 57 will restore flow to first filter 54a. Second filter 54b is equipped with two pressure switches, a first switch 58 set at, for example, 15 psi illuminates a light indicating the filter system is about to enter by-pass mode. Second switch 59 is set for a higher pressure say, for example 25 psi. When the back pressure to second filter 54b reaches this level, the filter unit 50 enters by-pass mode to keep coolant flowing to tooling orifice 13 so as not to interfere with operations of the machine tool. However, beacon 60 begins flashing to alert plant workers that the filter unit 50 is in the by-pass mode and that coolant is being cycled back to the machine tool 11 with only the metallic shavings removed.

The filtration system 20 of the present invention can remove ferrous metal from a liquid such as a liquid coolant from a machine tool 11, for example. The dual cannister filters 54a and 54b provides a built in redundancy which permits the first filter 54a to be serviced while the second filter 54b remains on line, thus providing continuous filtration. The system permits the filtration unit 50 to be by-passed when both filters are clogged so that coolant constantly flows to the machine tool 11. Filtration system 20 is palletized and easily connectable to electricity, air service and to the sump and feed lines of the machine tool so that it may be easily installed in virtually any shop.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A filtration system for removing metal shavings, tramp oil, sludge and dirt from a liquid, said filtration system comprising:
   (a) a tank separated into a clean side compartment and a dirty side compartment;
   (b) a magnetic separator for removing ferrous material from the liquid;
   (c) a filtering system including
      i) a first filter for removing particles up to 0.5 microns from the liquid;
      ii) a second filter for removing particles up to 0.5 microns from liquid;
   (d) pumping means for transferring a stream of said liquid from a machine tool to said magnetic separator and said compartments;
   (e) a sensor for detecting when said first filter is approaching an end of its service cycle;
   (f) circuit means to switch the stream of said liquid from said first filter to said second filter responsive to said sensor; and
   (g) an indicator for warning that said first filter has reached the end of its service cycle so that it can undergo maintenance;
      wherein elements (a) through (g) are arranged together to be positioned on a pallet and wherein said filtration system is configured such that liquid from said machine tool is pumped through said magnetic separator and into said dirty side compartment and then through said filtering system or a bypass thereof and into said clean side compartment for return to said machine tool.

2. The filtration system of claim 1 wherein said first and second filters comprise cylindrical canisters equipped with disposable filter bags for removing particulate down to 0.5 microns in diameter.

3. The filtration system of claim 1 wherein said first and second filters comprise cylindrical canisters equipped with oil absorbent material to remove tramp oil down to 0.5 microns in diameter.

4. The filtration system of claim 1 wherein said sensor comprises a pressure sensor for determining when a certain back pressure has been reached upstream of said first filter.

5. The filtration system of claim 4 wherein said certain back pressure comprises 25 psi.

6. The filtration system of claim 1 wherein said magnetic separator further comprises a drum made up of alternating disks of magnetic material and intermediate spacers.

7. The filtration system of claim 6 further comprising a floating scraper in contact with a surface portion of said drum to remove from said surface the metal shavings which are magnetically adhered thereto.

8. The filtration system of claim 1 further comprising a level detecting sensor positioned within the dirty side compartment of said tank, said level detecting sensor adapted to allow pumping of liquid from said dirty side compartment to said filtering system only when a sufficient amount of liquid is present within the dirty side compartment.

9. The filtration system of claim 1 further comprising a reset button for restoring flow to said first filter once a filter bag thereof has been changed.

10. The filtration system of claim 1 further comprising (i) a first pressure sensor upstream from said second filter for activating a warning signal when the back pressure at the second filter reaches a first set point and (ii) a second pressure sensor for activating a by-pass mode when the back pressure at the second filter reaches a second set point to deactivate the filter system while continuing to circulate the liquid to the machine tool.

* * * * *